(12) United States Patent
Yao et al.

(10) Patent No.: US 8,774,512 B2
(45) Date of Patent: Jul. 8, 2014

(54) FILLING HOLES IN DEPTH MAPS

(75) Inventors: Ning Yao, Pittsburgh, PA (US); Izzat Izzat, Plainsboro, NJ (US); Tao Zhang, Plainsboro, NJ (US); Dong-Qing Zhang, Plainsboro, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 464 days.

(21) Appl. No.: 12/658,464

(22) Filed: Feb. 9, 2010

(65) Prior Publication Data

US 2010/0208994 A1  Aug. 19, 2010

Related U.S. Application Data

(60) Provisional application No. 61/207,365, filed on Feb. 11, 2009.

(51) Int. Cl.
| | | |
|---|---|---|
| G06K 9/00 | (2006.01) | |
| G06K 9/34 | (2006.01) | |
| G06T 7/00 | (2006.01) | |
| G06T 5/00 | (2006.01) | |

(52) U.S. Cl.
CPC ....... *G06T 5/005* (2013.01); *G06T 2207/10024* (2013.01); *G06T 7/0093* (2013.01); *G06T 7/0081* (2013.01); *G06T 2207/10028* (2013.01)
USPC .......................................... 382/173; 382/154

(58) Field of Classification Search
None
See application file for complete search history.

(56) References Cited

U.S. PATENT DOCUMENTS

| | | | |
|---|---|---|---|
| 5,808,617 A | | 9/1998 | Kenworthy et al. |
| 6,847,728 B2 * | | 1/2005 | Tao et al. ...................... 382/106 |
| 2002/0061131 A1 * | | 5/2002 | Sawhney et al. ............. 382/154 |
| 2003/0108237 A1 | | 6/2003 | Hirata |
| 2003/0169906 A1 * | | 9/2003 | Gokturk et al. ............... 382/115 |
| 2008/0150945 A1 * | | 6/2008 | Wang et al. ................... 345/427 |
| 2009/0103616 A1 * | | 4/2009 | Ho et al. .................. 375/240.12 |

(Continued)

FOREIGN PATENT DOCUMENTS

| | | |
|---|---|---|
| EP | 0846308 | 6/1998 |
| EP | 2061005 | 5/2009 |

(Continued)

OTHER PUBLICATIONS

Park et al. "Segmentation based disparity estimation using color and depth information", ICIP 2004.*

(Continued)

*Primary Examiner* — Li Liu
(74) *Attorney, Agent, or Firm* — Robert D. Shedd; Brian J. Cromarty

(57) ABSTRACT

Various implementations relate to improving depth maps. This may be done, for example, by identifying bad depth values and modifying those values. The values may represent, for example, holes and/or noise. According to a general aspect, a segmentation is determined based on an intensity image. The intensity image is associated with a corresponding depth image that includes depth values for corresponding locations in the intensity image. The segmentation is applied to the depth image to segment the depth image into multiple regions. A depth value is modified in the depth image based on the segmentation. A two-stage iterative procedure may be used to improve the segmentation and then modify bad depth values in the improved segmentation, and iterating until a desired level of smoothness is achieved. Both stages may be based, for example, on average depth values in a segment.

20 Claims, 9 Drawing Sheets

(56) References Cited

U.S. PATENT DOCUMENTS

| | | | |
|---|---|---|---|
| 2009/0129667 A1* | 5/2009 | Ho et al. | 382/154 |
| 2010/0014781 A1* | 1/2010 | Liu et al. | 382/285 |
| 2010/0080448 A1* | 4/2010 | Tam et al. | 382/154 |
| 2010/0097389 A1* | 4/2010 | Lim et al. | 345/589 |
| 2011/0002541 A1* | 1/2011 | Varekamp | 382/173 |

FOREIGN PATENT DOCUMENTS

| | | |
|---|---|---|
| JP | 2001-143072 | 5/2001 |
| WO | WO 01/43071 | 6/2001 |
| WO | WO 2009061305 A1 * | 5/2009 |
| WO | WO 2009131287 A1 * | 10/2009 |

OTHER PUBLICATIONS

Maitre et al. "Joint encoding of the depth image based representation using shape-adaptive wavelets", ICIP 2008.*

Lee et al. "Segment-based multi-view depth map estimation using belief propagation from dense multi-view video", 3DTV-CON'08, 2008.*

Francois et al. "Depth-based Segmentation", IEEE Trans. Circuits and Systems for video tech. 1997.*

Cevahir Cigla et al. "Object Segmentation in Multi-View Video Via Color, Depth and Motion Cues", 2008 IEEE, Dept. of Electrical and Electronics Eng., M.E.T.U, Turkey, pp. 2724-2727.

Cevahir Cigla et al. "Depth Assisted Object Segmentation in Multi-View Video", 2008 IEEE, Department of Electrical and Electronics Eng., M.E.T.U. Turkey, pp. 185-1088.

Uri Boykov et al "Fast Approximate Energy Minimization Via Graph Cuts", Computer Science Department, Cornell University, 1999.

J.C. Carr et al. "Reconstruction and Representation of 3D Objects With Radial Basis Functions", Applied Research Associates NZ Ltd, University of Canterbury, 2001.

Gianluca cernigliaro et al, "Fast Mode Decision for Multiview Video Coding Based on Depth Maps", Visual Communications and Image Processing 2009; Proc. of SPIE-IS&T Electronic Imageing, vol. 7257, 72570N-1.

James Davis et al. "Filling Holes in Complex Surfaces Using Volumetric Diffusion", Proc. First Int'l Symposium of 3D Data Processing, Visualization, Transmission; Computer Science Dept., Stanford University, 2002.

Eunyoung Kim et al. "Planar Patch Based 3D Environment Modeling With Stereo Camera", 16$^{th}$ IEEE Int'l Conference on Robot & Human Interactive Communication, Aug. 26-29, 2007, Jeju, Korea, pp. 516-521.

Peter Liepa "Filling Holes in Meshes", Eurographics Symposium on Geometry Processing (2003).

Sashi Kumar Penta et al. "Compression of Multiple Depth Maps for IBR",Centre for Visual Informatin Technology Int'l Inst. of Information Technology, Gachibowli, India; Visual Comput (2005) 21:, pp. 611-618.

Jianbo Shi et al. "Normalized Cuts and Image Segmentation", 1997 IEEE, Computer Science Division, University of California, Berleley, CA US, pp. 731-737.

Richard Szeliski et al. "A Comparative Study of Energy Minimization Methods for Markov Random Fields", ECCV 2006, Part II, LNCS 3952, pp. 16-29, 2006.

J. Verdera et al. "Impainting Surface Holes", May 2, 2003; Dept. of Tecnologia, University of Pompeu-Fabra, Barcelona, Spain.

Daniel Scharstein et al. "A Taxonomy and Evaluation of Dense Two-Frame Stereo Correspondence Algorithms"; Dept. of Math and Computer Science Middlebury College US, pp. 1-35, 2002.

Jianning Wang et al. "A Hole-Filling Strategy for Reconstruction of Smooth Surfaces in Range Images" SUNY at Stony Brook, Dept. of Computer Science, Stony Brook, NY US, 2003.

Jonathan S. Yeddidia et al, "Generalized Belief Propagation", MERL, 2000.

Jun, "A Piecewise Hole Filling Algorithm in Reverse Engineering", Computer-Aided Design 37, 2005, pp. 263-270.

Wang et al., "Improved Scene Reconstruction from Range Images", Eurographics 2002, vol. 21, No. 3, 2002.

* cited by examiner

FILLING HOLES IN DEPTH MAPS

CROSS-REFERENCE TO RELATED APPLICATIONS

This application claims the benefit of the filing date of U.S. Provisional Application Ser. No. 61/207,365, filed on Feb. 11, 2009, titled "Filling Holes in Depth Maps", the contents of which are hereby incorporated by reference in their entirety for all purposes.

TECHNICAL FIELD

Implementations are described that relate to coding systems. Various particular implementations relate to identifying and filling holes in depth images.

BACKGROUND

Although using stereo to extract and reconstruct scene structure has been an active area for a long time, the rebuilding of dense depth information still includes many unsolved problems in the cases of insufficient feature points, occlusions, and textureless regions. Those undetermined regions are usually left empty as "holes" in the reconstructed depth images. This presents an ongoing problem in the art.

SUMMARY

According to a general aspect, a segmentation is determined based on an intensity image. The intensity image is associated with a corresponding depth image that includes depth values for corresponding locations in the intensity image. The segmentation is applied to the depth image to segment the depth image into multiple regions. A depth value is modified in the depth image based on the segmentation.

The details of one or more implementations are set forth in the accompanying drawings and the description below. Even if described in one particular manner, it should be clear that implementations may be configured or embodied in various manners. For example, an implementation may be performed as a method, or embodied as apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

In an implementation, the depth map, or more generally a depth image, for a given image is estimated. The areas of bad estimation are referred to as "holes". The holes may be the result of missing information in one view (for example, the views might be from different angles and not have completely overlapping subjects) or could be due to data just not agreeing (for example, not converging to a good result), for certain pixels. The identification of the holes and fixing the holes are issues that are addressed, at least in part, by this implementation.

Figure 1:
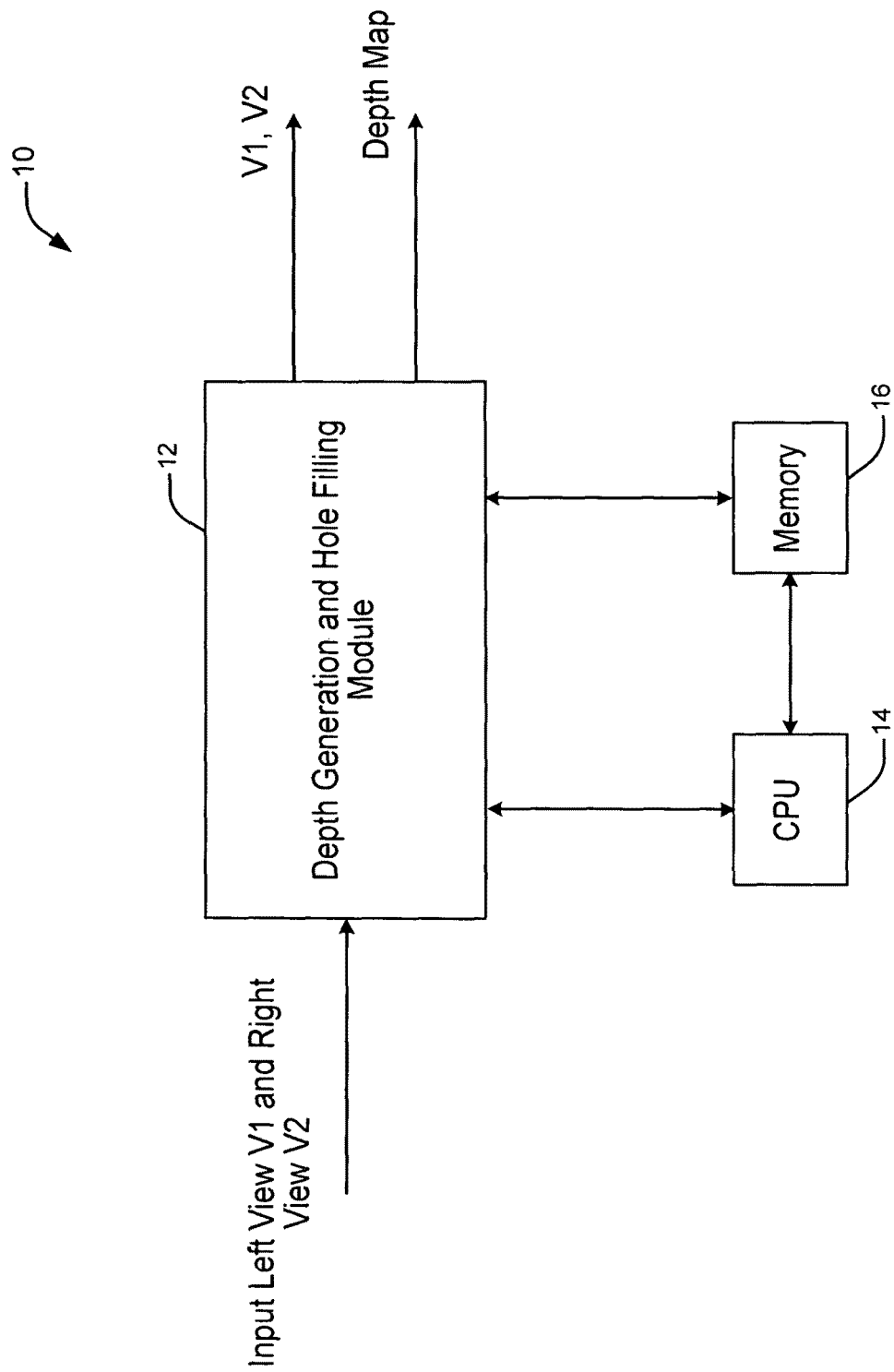
FIG. 1 is a block diagram of an apparatus for filling hoes in a depth map according to an implementation.

FIG. 1 shows a high level block diagram 10 of an apparatus for filling holes in depth maps according to an implementation. As will be described in more detail below, the depth generation and hole filling module 12 is configured to receive video streams which provide at least two views (for example, left and right views). The output of the module 12 includes a hole-filled depth map and the same video contents contained in the at least two video streams V1 and V2. The module 12 is coupled to, and may include, some computational resources, such as, for example CPU 14. CPU 14 may be coupled to, and may include, one or more memories 16. In one implementation, the depth generation and hold filling module 12 includes both the CPU 14 and the memory 16.

Another implementation of the depth generation and hole filling module receives as input a depth map. The depth map may have been generated from a stereo image pair, or in any other manner known in the art. The depth generation and hole filling module of this implementation does not generate the initial depth map from the stereo image pair. Rather, the depth generation and hole filling module of this implementation modifies the existing (received) depth map, for example, by using one of the algorithms described below, and produces (generates) a modified depth map as output. Depending on the algorithm used, the depth generation and hole filling module of this implementation may use one or more of the stereo images to perform segmentation.

Figure 2:
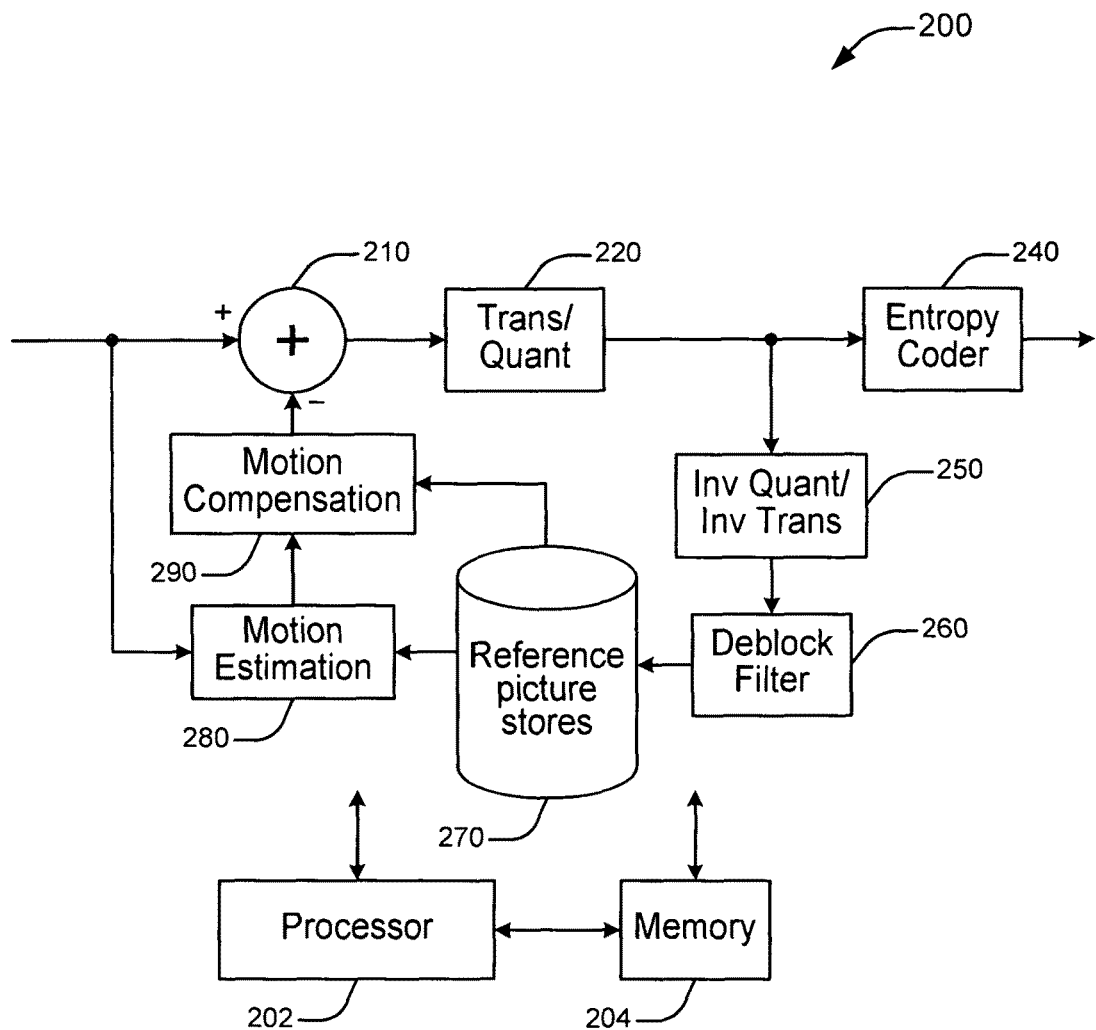
FIG. 2 is a block diagram of an implementation of an encoder.
Figure 3:
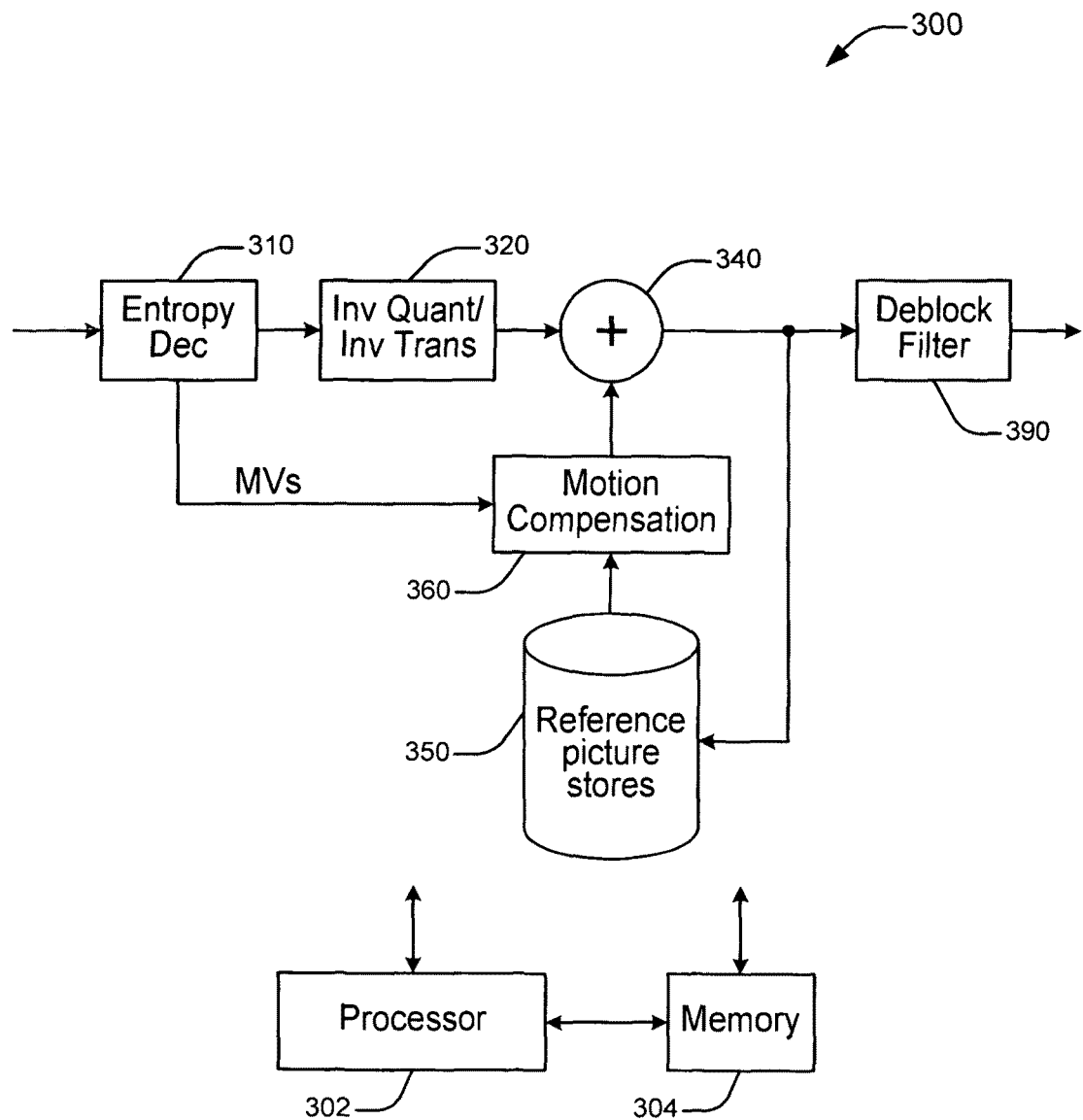
FIG. 3 is a block diagram of an implementation of a decoder.

According to an implementation, the depth generation and hole filling can be performed before or after compression of the video streams. In one implementation that performs the depth generation and/or hole filling after compression of the video streams, the video is decompressed prior to performing the depth generation and/or hole filling. FIGS. 2 and 3 show an encoder and decoder, respectively, as examples for a compression application of the present principles.

Implementations that use an encoder or decoder can couple the encoder or decoder to the depth generation and hole filing module in various manners. Several examples include the depth generation and hole filling module (1) providing a modified depth map to an encoder, (2) receiving a decoded stereo image pair from a decoder and generating an initial depth map based on the decoded stereo image pair, and generating a modified depth map using one or more of the algorithms described in this application, or (3) receiving a decoded depth map and a decoded video image from a decoder and generating a modified depth map based on the decoded depth map and the decoded video image.

FIG. 2 shows a exemplary video encoder 200 to which the present principles may be applied. As mentioned above, the input to the encoder can be the output of the depth generation and hole filling module 12 discussed above. The input is in signal communication with a non-inverting input of a summing junction 210 (also referred to as a combiner 210). The output of the summing junction 210 is connected in signal communication with a transformer/quantizer 220. The output of the transformer/quantizer 220 is connected in signal communication with an entropy coder 240.

The output of the transform/quantizer 220 is further connected in signal communication with an inverse transformer/quantizer 250. An output of the inverse transformer/quantizer 250 is connected in signal communication with an input of a deblock filter 260. An output of the deblock filter 260 is connected in signal communication with a reference picture store 270. A first output of the reference picture store 270 is connected in signal communication with a first input of a motion estimator 280. The input to the encoder 200 is further connected in signal communication with a second input of the motion estimator 280. The output of the motion estimator 280 is connected in signal communication with a first input of a motion compensator 290. A second output of the reference picture store 270 is connected in signal communication with a second input of the motion compensator 290. The output of the motion compensator 290 is connected in signal communication with an inverting input of the summing junction 210.

The processor 202 and memory 204 are in signal communication with one or all of the above mentioned components (depending on the particular decoder) and provide computational capability for the same. Thus, in one implementation, the module 12 is configured to provide its output (the video streams V1 and V2 and the hole filled depth map) in signal communication with the input of the encoder 200. Alternatively, the module 12 can be configured to receive as its input the output of encoder 200, and in one implementation this output of the encoder is decompressed and then processed by the module 12.

FIG. 3 shows an exemplary video decoder 300 to which the present principles may be applied. The video decoder 300 includes an entropy decoder 310 for receiving a video sequence (for example, video streams V1, V2). A first output of the entropy decoder 310 is connected in signal communication with an input of an inverse quantizer/transformer 320. An output of the inverse quantizer/transformer 320 is connected in signal communication with a first non-inverting input of a combiner 340.

The output of the combiner 340 is connected in signal communication with an input of a deblock filter 390. An output of the deblock filter 390 is connected in signal communication with an input of a reference picture store 350. The output of the reference picture store 350 is connected in signal communication with a first input of a motion compensator 360. An output of the motion compensator 360 is connected in signal communication with a second non-inverting input of the combiner 340. A second output of the entropy decoder 310 is connected in signal communication with a second input of the motion compensator 360, for providing, for example, motion vector information. The motion vector information may be for use by the motion compensator 360 in selecting an appropriate portion of a reference picture. The output of the deblock filter 390 is available as an output of the video decoder 300.

FIGS. 2 and 3 show particular implementations, but other implementations are contemplated. For example, another implementation does not have separate inputs on one or more of the blocks of FIG. 2 (or FIG. 3). Rather, a single input is used to receive multiple signals. As a specific example, motion estimator 280 may have only a single input. The single input receives the input to the encoder 200 as well as the output from reference picture store 270. Further, another implementation of reference picture store 270 only has a single output that provides both the signal to motion compensator 290 and the signal to motion estimator 280. Similar adaptations are contemplated for the implementation of FIG. 3, as well as other figures and implementations described throughout this application.

Depth estimation from stereo has been an active area of research for many years. Although a lot of work on depth estimation has been done, filling the holes on textureless regions is still an open research problem. Although using stereo to extract and reconstruct scene structure has been an active area for a long time, the rebuilding of dense depth information still includes many unsolved problems in the cases of insufficient feature points, occlusions, and textureless regions. Those undetermined regions are usually left empty as "holes" in the reconstructed depth images.

Many factors, such as insufficient feature points, correspondence mismatching, and large textureless areas, affect the depth estimation results even though one may have an accurate calibration of stereo cameras. In at least one implementation, we use an algorithm that uses both intensity image segmentation and depth estimation results to fill holes and reduce mismatching noise.

This disclosure presents one or more implementations that fill the holes in depth image estimation. As used herein, the terms depth image and depth map are used interchangeably, although depth image is a more general term. At least one such implementation fills holes by fusing the normalized cuts segmentation of an intensity image with its depth map. A two-stage iterative procedure is proposed to co-adjust the segmentation result and the depth image, which results in better estimates of the depth values at the pixels in hole-regions. This procedure is also capable of reducing the mismatching noise in the depth map estimation. In at least one implementation, Markov random field methods and normalized cuts methods are used in the initial depth estimation and segmentation steps.

Various implementations are presented herein, at least one of which is a new holes-filling method to fill the undetermined regions in depth images which may come from textureless patches such as, for example, a wall, a door, or a table surface. To complement the lack of correspondences in those areas, we apply a segmentation algorithm on the intensity image to obtain a better partition reference by incorporating information, such as color, or contrast, which is typically not considered in depth estimation using stereo reconstruction methods. A two-stage iterative procedure is then proposed to co-adjust the segmentation results and the depth images. Finally, we fill the holes and smooth the mismatching noise with weighted depth values in partitioned patches. In the approach of at least one implementation, a pixel labeling method is used based on Markov Random Fields to estimate the depth image using Graph Cuts from the intensity images (for example, the stereo image pairs), and applying a normalized cuts algorithm to segment the intensity images.

An "intensity image", as used herein refers to an image formed of intensity values. An intensity image may refer, for example, to a black-and-white image, a gray-scale image, or any of the component images of a color image. An intensity image may also refer to a depth image, as the levels of intensity of the depth image are used to identify the holes or noise (as described in more detail below). However, an intensity image is generally used in this application to refer to a video image (for example, one of a pair of stereoscopic images), rather than a depth image.

In another implementation, the present principles may be applied to multiple component images. For example, the image used in the segmentation may be a color image and the depth map is a grayscale image. In the segmentation stage, the segmentation method can operate on the color image directly or operate on separate channels first and combine the results later.

Depth Estimation by Markov Random Field Method

Assigning a label for each pixel to represent local quantities, such as disparities, had been used a lot in early computer vision problems. One of the popular approaches is to model this assignment strategy as an energy minimization problem which usually has two components: one penalizes solutions that are inconsistent with the observed data, while the other enforces spatial coherence. This framework is prevalent because of its ability to justify in terms of maximum a posteriori estimation of a Markov Random Field (MRF).

For disparity estimation from noisy measurement, the disparity map tends to be piecewise smooth. That is, the disparity map varies smoothly at most points but changes dramatically at patch boundaries. Each pixel p∈P is assigned a label (disparity value) in a set L. A labeling function $f$ is constructed to assign each pixel p a disparity value $f_p$∈L, where $f$ is both piecewise smooth and consistent with the observed data. The disparity estimation can be generally formulated in terms of energy minimization of seeking the labeling $f$:

$$E(f) = E_{smooth}(f) + E_{data}(f)$$

where $E_{smooth}(f)$ enforces the smoothness of the estimated disparity map and $E_{data}(f)$ represents the measurement of the difference between $f$ and the observed data.

Many different energy minimization functions have been proposed in the literature. The form of $E_{data}(f)$ is usually defined as $$E_{data}(f) = \sum_{p \in P} J_p(f_p),$$

here $J_p$ measures label validity for a given pixel p. The choice of $E_{smooth}(f)$ is a critical issue and various functions have been suggested.

A major difficulty with energy minimization methods has been their enormous computational costs. In the last few years, energy minimization approaches have received much attention again, primarily due to powerful new optimization algorithms such as graph cuts and loopy belief propagation (LBP). According to the widely used Middlebury stereo benchmarks, the energy minimization approaches achieved very good results in stereo and almost all the top-performing stereo methods rely on graph cuts or LBP.

We used the C++ source code for MRF estimation method, which was provided on the Middlebury Stereo Vision page, to estimate disparities of stereo pairs in at least one implementation. The parameters are tested and adjusted according to our dataset and experimental requirements. Since the depth image is derived by scaling the disparity map with a global scalar, we generally use the depth image instead of disparity map in the following sections for convenience.

Normalized Cuts Segmentation

In at least one implementation, we reconstruct holes in depth data by looking at neighboring points and interpolating them. It is natural to preserve the objects' boundaries in depth data, especially around the holes, since most of them can help to indicate the planar textureless regions. Therefore, we utilize the segmentation of intensity images (the stereo video images) to optimize the depth images since the intensity images can provide more information such as color, texture, and intensity.

There are many possible partitions of an image into segments and multiple solutions may exist. The lower level cues, such as coherence of brightness, color, texture, or motion, and mid- or high-level knowledge all contribute to the partition, therefore it is inherently hierarchical. In one implementation, a method called normalized cut (Ncuts) is used to implement the segmentation. Those of ordinary skill in the art will recognize that other methods for segmentation can be implemented without departing from the scope of this application.

In the Ncuts method, a graph-theoretic criterion is used for measuring the goodness of an image partition. A graph G=(V, E) can be partitioned into two disjoint sets, A, B, A∪B=V, A∩B=Ø by removing edges connecting the two sets. The measure of dissimilarity between two sets can be computed as a summation of weighted removed edges. In graph theoretic language, it is called the cut:

$$cut(A, B) = \sum_{u \in A, v \in B} w(u, v).$$

To avoid bias for partitioning out small sets of points, a measure of disassociation between two groups can be used that is called normalized cuts:

$$Ncut(A, B) = \frac{cut(A, B)}{assoc(A, V)} + \frac{cut(A, B)}{assoc(B, V)}.$$

where $assoc(A, V) = \sum_{u \in A, t \in V} w(u, t)$ is the total connection from nodes in A to all nodes in the graph and assoc(B,V) is similarly defined.

In the similar way, a measure for total normalized association within a group for a given partition is defined as $$Nassoc(A, B) = \frac{assoc(A, A)}{assoc(A, V)} + \frac{assoc(B, B)}{assoc(B, V)}.$$

where assoc(A,A) and assoc(A,A) are total weights of edges connecting nodes within A and B, respectively.

Hence, the segment partition can be implemented by minimizing the disassociation between the groups and maximizing the association within the groups. The minimization approach can be formulated as a generalized eigenvalue problem. Good segmentation of the image can be constructed with the eigenvectors and this process is recursive.

Two-Stage Iterative Hole Filling

In at least one implementation we employ a two-stage method to improve the depth images. On the first "forward" stage, we use the noisy depth image to improve the segmentation results. Then we use the enhanced segmentation results to help fill the holes in the depth images in the "backward" stage.

Forward Stage:

The results from the original Ncuts segmentation algorithm tend to be fragmented because of the local texture, pre-defined parameters, illumination conditions, and so on.

Figure 8A:
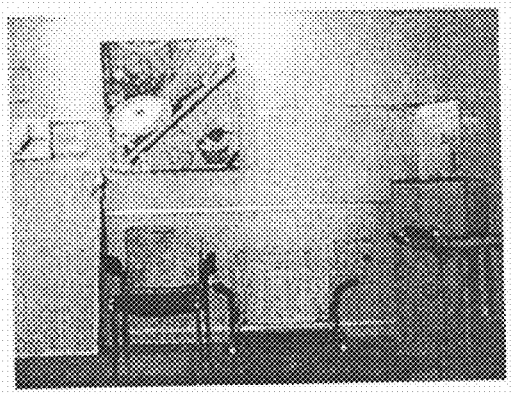
FIGS. 8a-8f are exemplary images showing an example of an implementation of a method for identifying and filling holes in a depth map.
Figure 8B:
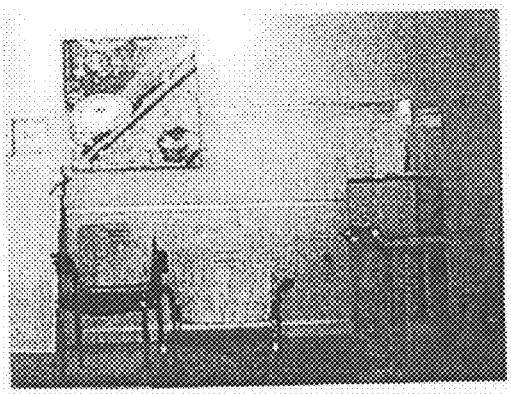
Figure 8C:
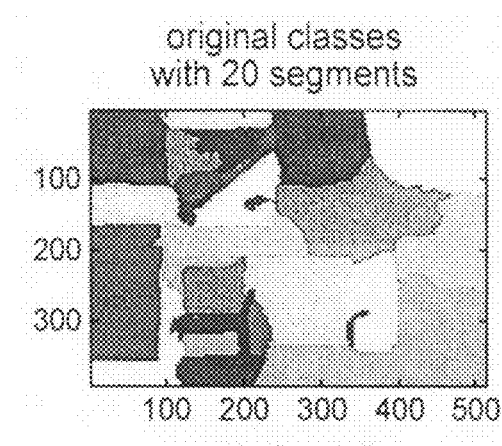
Figure 8D:
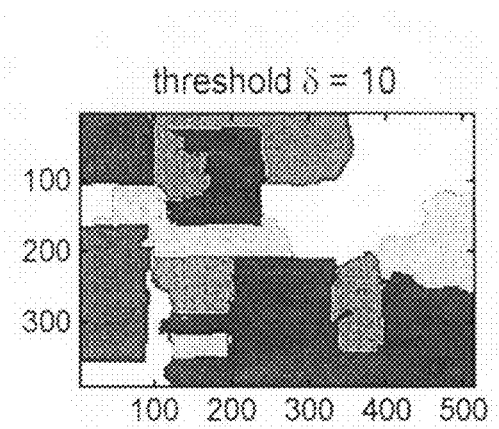

But it is generally good at partitioning large textureless patches as can be seen in FIG. 8(c). The depth map is less sensitive to local patterns (as shown in FIG. 8(d)). These properties can be used to set variable thresholds to improve the original segment by a region growing approach.

In an implementation, the region growing process is controlled by a threshold δ. Larger regions are grown from the initial segment by merging adjacent regions with similar depth values if their average difference is less than the threshold δ. The merging criterion is defined in Eq. (1), which is shown and discussed later.

In Eq. (1), $R_i$ and $R_j$ the original regions, I(u,v) is the magnitude at pixel (u,v) in the depth image; $N_i$ and $N_j$ represent the number of pixels in region $R_i$ and $R_j$, respectively.

Backward Stage:

Using the improved segmentation results, we perform hole-filling on a depth image. We also use the new segmentation to smooth obvious mismatching noise in the depth image. We identify those pixels whose values are much larger or smaller than the average in the same region, and consider those identified pixels as noise and use a weighted value to replace them.

Figure 8E:
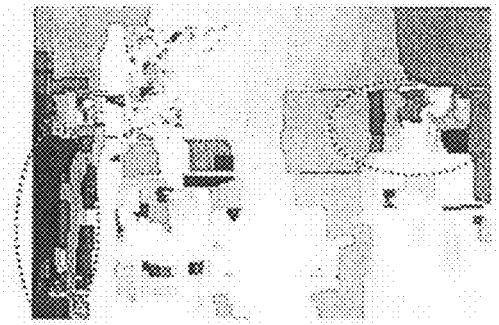
Figure 8F:
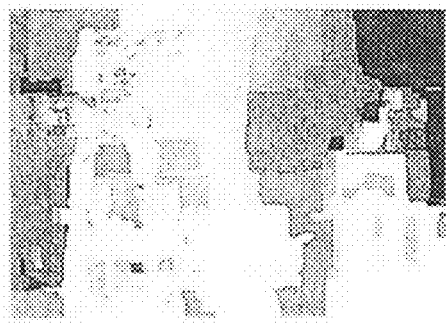

The criterion for the smoothing process in region $R_i$ for hole-filling and noise reducing is represented in Eqs. (2)-(4) below, where $A_i$ is the set of holes and noise with very low intensity in region $R_i$; $B_i$ is the set of noise with very high intensity; $\omega_1, \omega_2, \omega_3$ are predefined weights. Currently, we set the holes and noisy pixels to the same weighted value, although other implementations may set the holes and noisy pixels to different values. The hole-filling and noise reducing results are shown in FIG. 8(f).

Figure 4A:
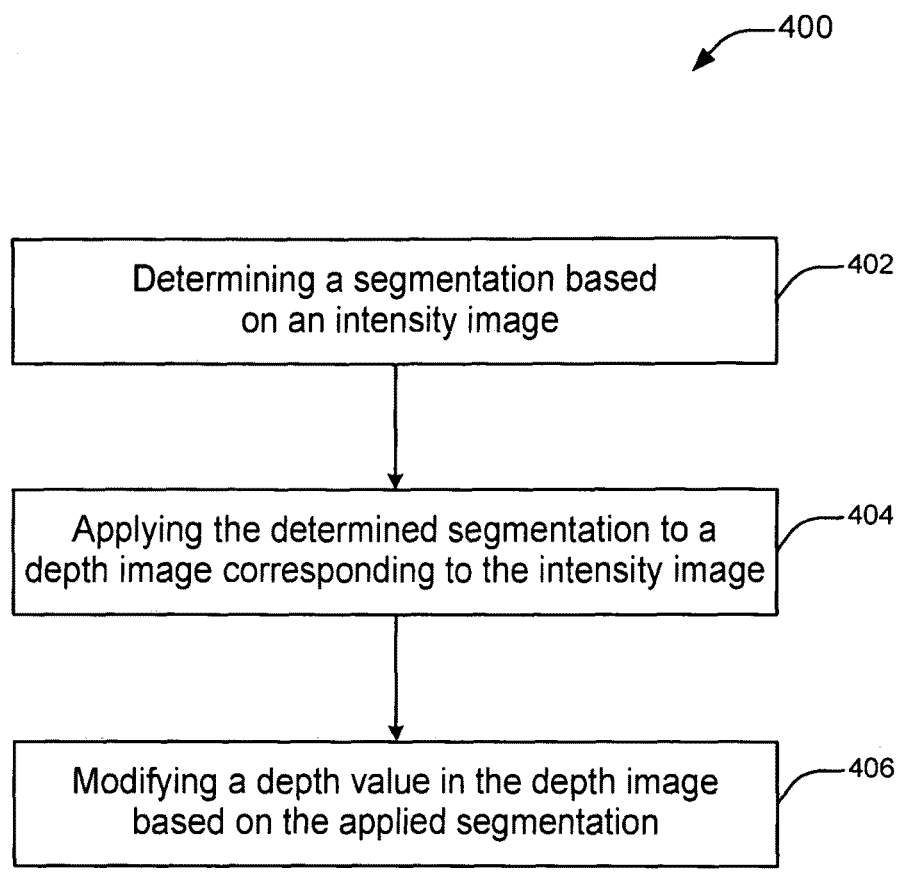
FIG. 4a is a flow diagram of a method for filling holes in a depth image according to an implementation.
Figure 4B:
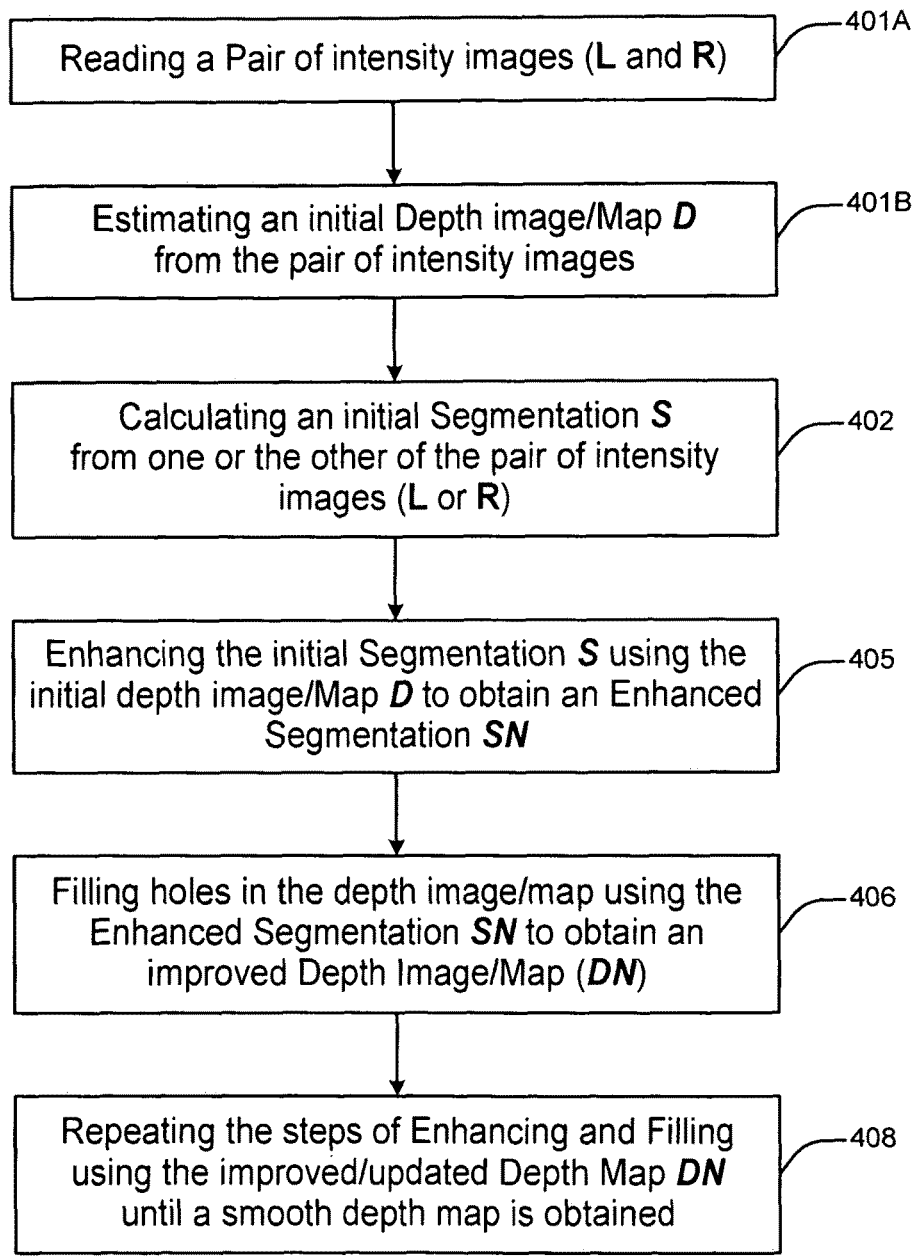
FIG. 4b is a flow diagram of a method for filling holes in a depth image according to an implementation.

The two stage depth map hole filling method 400 according to an implementation is shown in FIGS. 4a and 4b.

Referring to FIG. 4a, the method starts by making a segmentation determination (402) based on an intensity image. The determined segmentation is applied (404) to a depth image corresponding to the intensity image, and the depth image is then modified (406) based on the applied segmentation.

Note that FIG. 4a describes a general process. Applying the determined segmentation to the depth image (404) refers, for example, to using the video-image segmentation on the depth image. This applies a segmentation that might not have been possible if only the depth image were considered.

Referring to FIG. 4b, there is shown the method 400 according to another implementation. Initially, a pair of intensity images are read (401a). For example a left (L) image and a right (R) image from a stereoscopic camera. Next, the initial depth image D is estimated (401b) from the pair of images L and R. Note, that many holes may exist in this depth image. The depth image estimation algorithm can be any known algorithm suitable for estimating the depth image. In the exemplary implementation, the Markov Random Field based method is used.

Once the depth image is estimated, an initial segmentation S is calculated (402) from one of the images L or R. According to an implementation, the segmentation can be performed by any suitable known segmentation method. In the exemplary implementation, the segmentation method known as Ncuts has been used.

In accordance with one aspect, the following are two stages (a Forward and a Backward stage) which are performed and enable the identification and filling of the holes in the initial depth image D. In the Forward stage, the initial segmentation S and initial Depth image D are used to calculate an enhanced segmentation SN (405). The details of how this enhanced segmentation SN is obtained is described in more detail below. Next, the backward stage is performed where the holes in the initial depth image D are filled using the enhanced segmentation SN to obtain an improved depth image DN (406). More details of an exemplary implementation of the Backward stage is also described below.

Once the Forward (405) and Backward (406) stages are performed for the first time, they are iteratively repeated (408) to until a smooth depth image is obtained. As discussed in more detail below, implementations may apply a variety of different stopping conditions.

Figure 5:
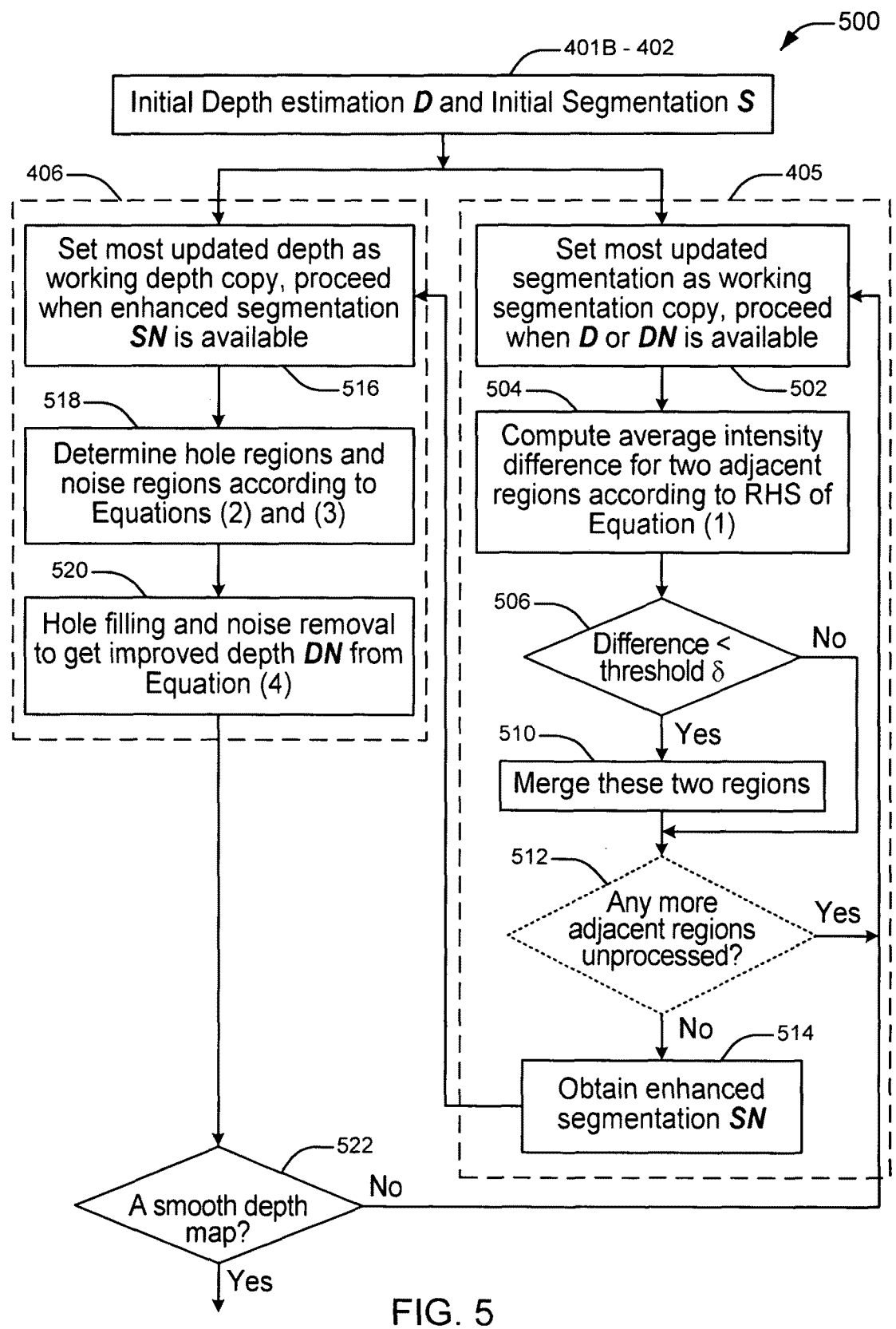
FIG. 5 is a flow diagram of a two stage method for filling holes in a depth image according to an implementation.

Referring to FIG. 5, and according to an implementation, there is shown an overview flow diagram of the two stage hole filling method 500 where the Forward stage (405) and the Backward stage (406) are provided in additional detail.

As mentioned above with reference to FIG. 4b, the initial depth estimation D (401b) is performed from a pair of intensity images, and the initial segmentation (402) is performed from one (or possibly more) of those intensity images.

Initially, we discuss the Forward stage 405:

1. Initially, the most updated segmentation is set up as a working segmentation copy and the process proceeds when the initial depth image D or improved depth image DN is available (step 502). In order to set up the updated segmentation as proposed, we let $R_i$ and $R_j$ be two sub-regions in the initial segmentation S, $N_i$ and $N_j$ be the number of pixels in region $R_i$ and $R_j$. Let I(u,v) be the depth value at point (u,v) in the initial depth image D.
2. Next, the difference of the average intensity in regions $R_i$ and $R_j$ is computed (504) using the formula shown in the right hand side (RHS) of equation (1).

$$\delta > \left| \sum_{u,v \in R_i} \frac{I(u,v)}{N_i} - \sum_{u,v \in R_j} \frac{I(u,v)}{N_j} \right| \quad (1)$$

3. A determination is then made (506) whether the difference in average intensity in the identified regions meets a predetermined threshold δ. If the difference of the average intensity in two regions is less than threshold, for example δ=10, these two regions are merged (510). Those of ordinary skill in the art will appreciate that this threshold may be obtained by statistical methods or may be predefined. The result is the enhanced segmentation SN.
4. In accordance with one implementation, there could be two alternative steps after step 510. Particularly, there could be no further processing, and the process proceeds to the backward stage 406 once the enhanced segmentation is obtained (step 514), or a decision step 512 can be added where steps 502, 504, and 506 are performed for all adjacent regions until there is no further change. To elaborate on various implementations, the algorithm could process all regions one time and then stop, or continue processing regions until there are none that can be combined based on the average intensity test above. Additionally, in a given iteration, regions may be processed based on the region boundaries existing at the beginning of that iteration, regardless of whether that region has been merged during that iteration. Conversely, once a region is merged during the iteration, then the new region boundary may be used in subsequent comparisons during that iteration.

The details of the Backward stage 406 are shown in FIG. 5 and are described in the context of the following equations:

$$A_i = \left\{ (u, v) : I(u, v) < \omega_1 \cdot M, M = \sum_{u', v' \in R_i} \frac{I(u', v')}{N_i} \right\} \quad (2)$$

$$B_i = \left\{ (u, v) : I(u, v) > \omega_2 \cdot M, M = \sum_{u', v' \in R_i} \frac{I(u', v')}{N_i} \right\} \quad (3)$$

$$I(u, v) = \omega_3 \cdot \sum_{u', v' \in R_i} \frac{I(u', v')}{N_i}, \forall (u, v) \in A_i \cup B_i \quad (4)$$

Initially, the most updated depth image DN is set as the working depth copy (step 516), and when the enhanced segmentation SN is available from the Forward stage, the hole regions and noise regions are identified using equations (2) and (3) (step 518). As shown, $A_i$ is the set of locations in region $R_i$ having intensity below a given threshold determined by $\omega_1$ and the average intensity for the region (typically, having very low intensity). Those locations in $A_i$ may include, for example, holes and noise. Additionally, $B_i$ is the set of locations in region $R_i$ having intensity above another given threshold determined by $\omega_2$ and the average intensity for the region (typically, having very high intensity). Those locations in $B_i$ are generally referred to as noise. Note that $\omega_1$, $\omega_2$, $\omega_3$ are weights. Thus, through the use of the weighting factors, we can identify whether a depth value for a particular region is sufficiently above or below the average intensity for that region. When the depth value is sufficiently below the average (using the $\omega_1$ weighting factor), we refer to it as noise with low intensity, and identify it as a "hole". If the given depth is well above the average (using the $\omega_2$ weighting factor), we refer to it as noise with high intensity. By way of example, some sample values for $\omega_1$ and $\omega_2$ are 0.2 and 1.2, respectively. In this example, if the average depth value is 10, depths are identified in Equations 2 and 3 that are below 2 and above 12.

Once determined, the holes are filled and the noise is removed to obtain the improved DN using equation (4) (Step 520). Thus, those of ordinary skill in the art will recognize that the hole and noise regions represented by $A_i$ and $B_i$ are filled with the weighted depth value in equation (4). Those of ordinary skill in the art will again appreciate that the value of $\omega_3$ can be derived from a library depending on the application. In one implementation, the weighting factor $\omega_3$ can be the same for both high and low noise determinations (as shown in Equation 4), while in other implementations different values for weighting factor $\omega_3$ are used for high and low noise. That is, other implementations fill the set by $A_i$ using the weighting factor $\omega_3$, but fill the set by $B_i$ using a different weighting factor which we may refer to as $\omega_4$. The value for weighting factor $\omega_3$, or $\omega_4$, can be determined, for example, by the average intensity around the holes (assumed in this implementation to be low intensity noise) and/or around the high intensity noises.

In accordance with various implementations Equation (4) can be modified to have separate weighting factors for $A_i$ and $B_i$. Additionally, the selection of these weighting factors can be impacted by lighting conditions and image contents. In one implementation, if the area is very bright, a larger weighting factor is selected than if the area is relatively dark. Weighting factors can be the same for all holes (or noise), and can be based, for example, on pixel values around the holes (or noise), or can be, for example, different for each hole (noise location). Those of skill in the art will appreciate that in different implementations, these weighting factors could be arbitrarily set by a user or automatically generated based on one or more other variable factors which relate to the particular application and implementation of the present principles.

Once the holes are filled and noise removed, a determination is made at step 522 as to whether the depth image is smooth. This determination as to whether the depth image is smooth is based on the application's requirement. For example, 3D movie or video playback applications may have a lower requirement on the smoothness of the depth map as opposed to 3D modeling or visualization applications. The lower requirements may be because minor depth discontinuity may not be noticeable for human eyes during 3D video playback, but it could be readily visible if we render the 3D surface inferred by the depth map on a computer display. If yes, the process ends. If the answer is no (meaning the depth image is not smooth), the process returns to the beginning of forward stage at step 502. Other implementations do not include decision block 522 and merely perform the two stages one time. Yet other implementations perform the two stages a predetermined multiple number of times, and the predetermined number may be, for example, fixed or set by a user.

Experiment Results

Figure 6:
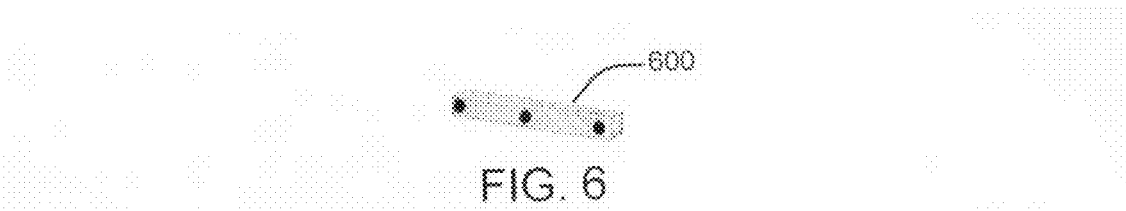
FIG. 6 is a view of a stereo camera according to an implementation.
Figure 7L:
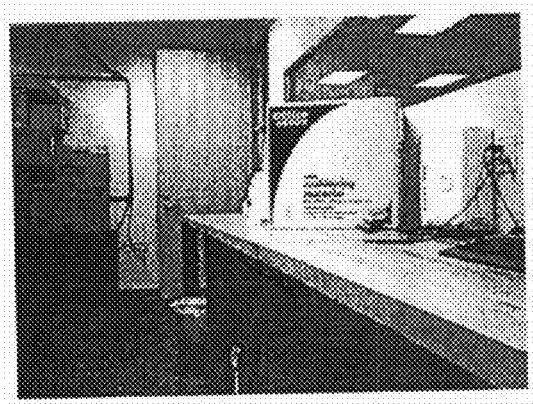
FIGS. 7L and 7R are examples of left and right images taken by the camera of FIG. 6.
Figure 7R:
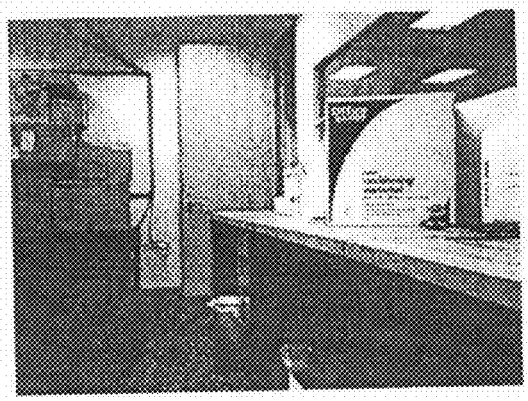

In the experiments conducted, a Point Grey Research's Bumblebee® XB3 IEEE-1394 Stereo Vision camera system was used to capture stereo images of indoor scenes. The supporting Software Development Kit ("SDK") provides functions to calibrate and rectify acquired images. FIG. 6 shows an example of the stereo camera 600 and FIGS. 7L and 7R are a pair of rectified images generated by the camera 600.

The Markov Random Field (MRF) method was used to estimate the depth map and Ncuts method was used to initially segment the left intensity image. Then our two-stage hole filling process was used to improve the segmentation result, fill holes, and reduce estimation noise. FIGS. 8(a) and 8(b) are a pair of rectified intensity images. FIG. 8(c) shows the initial segmentation using Ncuts method and FIG. 8(d) shows the region growing results when we set the threshold $\delta$ as 10. The number of patches (segments) in the initial segmentation can be arbitrarily set, however at least one implementation selects a number that is significantly larger than the expected number of patches in the image. By starting with a larger number, the algorithm can merge patches to arrive at a (lower) number of patches that closely approximates the real number. In the forward stage, the patch region grows according to their depth information which is insensitive to fine texture and patterns, therefore this region growing process is able to resist patterns on the same planar patch. That is, the region growing process is not typically fooled or sidetracked by patterns because it is focusing on depth. FIG. 8(e) is the depth map from MRF method. It has obvious holes (the dark patches) and some are circled in the figure for comparison purpose. In FIG. 8(f), we show the depth estimation using the method of one implementation after one iteration. The holes and mismatching noise were smoothed compared to the original depth map in FIG. 8(e).

Figure 9:
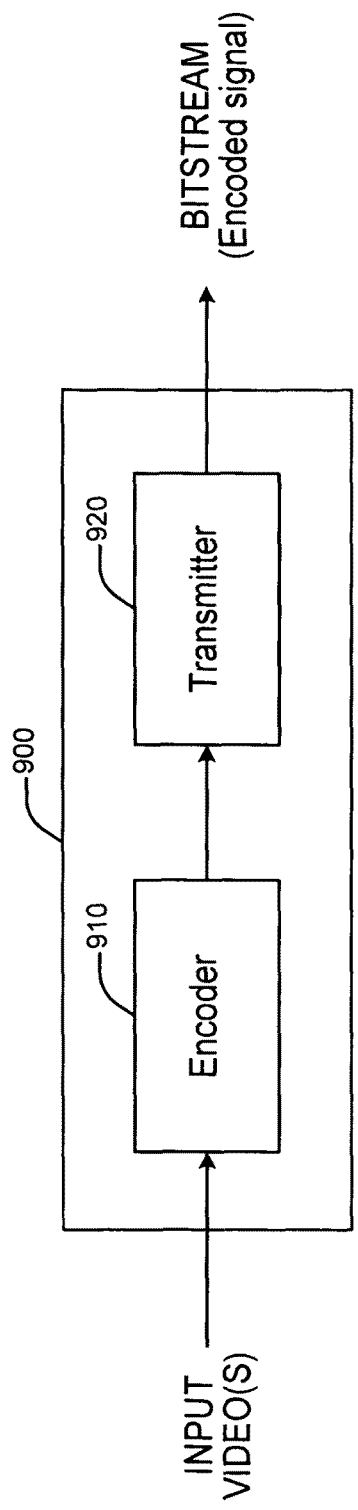
FIG. 9 is a block diagram of an implementation of a transmission system.

FIG. 9 shows an exemplary video transmission system 900, to which the present principles may be applied, in accordance with an implementation of the present principles. The video transmission system 900 may be, for example, a head-end or transmission system for transmitting a signal using any of a variety of media, such as, for example, satellite, cable, telephone-line, or terrestrial broadcast. The transmission may be provided over the Internet or some other network.

The video transmission system 900 is capable of generating and delivering video content and depth content, for example. This is achieved by generating an encoded signal(s) including video and including depth information or information capable of being used to synthesize the depth information at a receiver end that may, for example, have a decoder.

The video transmission system 900 includes an encoder 910 and a transmitter 920 capable of transmitting the encoded signal. The encoder 910 receives video and/or depth information and generates an encoded signal(s). The encoder 910 may be, for example, the encoder 200 described in detail above.

The transmitter 920 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers. The transmitter may include, or interface with, an antenna (not shown). Accordingly, implementations of the transmitter 920 may include, or be limited to, a modulator.

Figure 10:
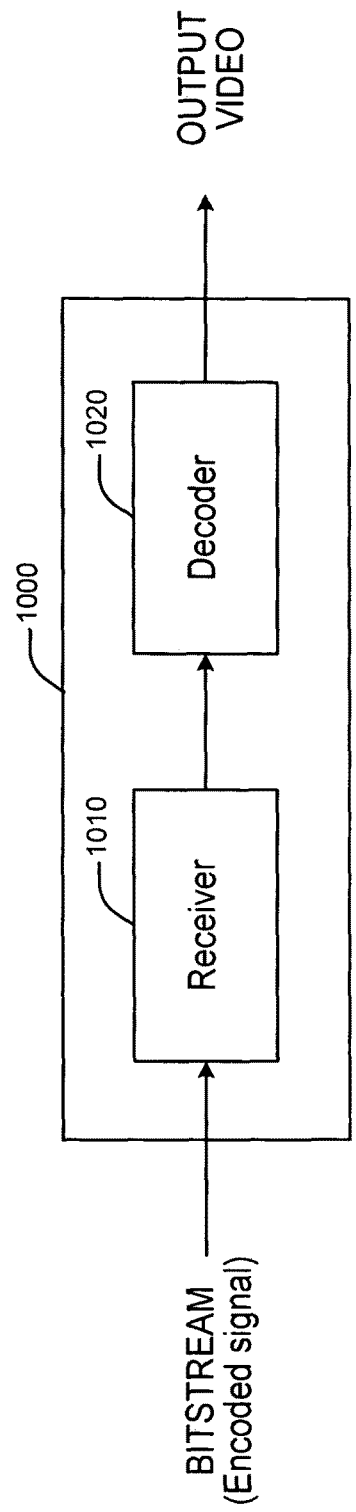
FIG. 10 is a block diagram of an implementation of a receiving system.

FIG. 10 shows an exemplary video receiving system 1000 to which the present principles may be applied, in accordance with an embodiment of the present principles. The video receiving system 1000 may be configured to receive signals over a variety of media, such as, for example, satellite, cable, telephone-line, or terrestrial broadcast. The signals may be received over the Internet or some other network.

The video receiving system 1000 may be, for example, a cell-phone, a computer, a set-top box, a television, or other device that receives encoded video and provides, for example, decoded video for display to a user or for storage. Thus, the video receiving system 1000 may provide its output to, for example, a screen of a television, a computer monitor, a computer (for storage, processing, or display), or some other storage, processing, or display device.

The video receiving system 1000 is capable of receiving and processing video content including video information and/or depth information. The video receiving system 1000 includes a receiver 1010 capable of receiving an encoded signal, such as for example the signals described in the implementations of this application, and a decoder 1020 capable of decoding the received signal.

The receiver 1010 may be, for example, adapted to receive a program signal having a plurality of bitstreams representing encoded pictures. Typical receivers perform functions such as, for example, one or more of receiving a modulated and encoded data signal, demodulating the data signal from one or more carriers, de-randomizing the energy in the signal, de-interleaving the data in the signal, and error-correction decoding the signal. The receiver 1010 may include, or interface with, an antenna (not shown). Implementations of the receiver 1010 may include, or be limited to, a demodulator.

The decoder 1020 outputs video signals including video information and depth information. The decoder 1020 may be, for example, the decoder 300 described in detail above.

As described above, the above principles for hole identification and hole filling in depth images may be applied and adapted for other implementations without departing from the scope of the present application. Although implementations described herein may be described in a particular context, such descriptions should in no way be taken as limiting the features and concepts to such implementations or contexts. For example, the method steps of the described implementations could be performed in the encoder, decoder, and could even be transmitted in a video signal containing the information needed for either the encoder or decoder to perform the depth image hole identification and filling processes.

We thus provide one or more implementations having particular features and aspects. However, features and aspects of described implementations may also be adapted for other implementations. For example, several of the implementations and features described in this application may be used in the context of depth coding. However, these implementations and features may be used in the context of coding video and/or coding other types of data.

Several of the implementations and features described in this application may be used in the context of the H.264/MPEG-4 AVC (AVC) Standard, or the AVC standard with the MVC extension, or the AVC standard with the SVC extension. However, these implementations and features may be used in the context of another standard (existing or future), or in a context that does not involve a standard. We thus provide one or more implementations having particular features and aspects. However, features and aspects of described implementations may also be adapted for other implementations.

Implementations may signal information using a variety of techniques including, but not limited to, SEI messages, slice headers, other high level syntax, non-high-level syntax, out-of-band information, datastream data, and implicit signaling. Accordingly, although implementations described herein may be described in a particular context, such descriptions should in no way be taken as limiting the features and concepts to such implementations or contexts.

Additionally, many implementations may be implemented in one or more of an encoder, a decoder, a post-processor processing output from a decoder, or a pre-processor providing input to an encoder. Further, other implementations are contemplated by this disclosure.

Those of skill in the art will appreciate that throughout this disclosure, we refer, for example, to "video" or "image" or "picture" or "video image". Such references may include any various video components or their combinations. Such components, or their combinations, include, for example, luminance, chrominance, Y (of YUV or YCbCr or YPbPr or YPcPr), U of (YUV), V (of YUV), Cb (of YCbCr), Cr (of YCbCr), Pb (of YPbPr), Pr (of YPbPr or YPcPr), Pc (of YPcPr), red (of RGB), green (or RGB), blue (of RGB), S-Video, and negatives or positives of any of these components.

Also, as used herein, the words "picture" and "image" are used interchangeably and refer, for example, to all or part (a portion) of a still image or all or part (a portion) of a picture from a video sequence. More generally, a picture refers, for example, to any set of image or video data. A picture may be, for example, a pixel, a macroblock, a slice, a frame, a field, a full picture, a region bounding an object in the picture, the foreground of the picture, the background of the picture, or a particular set of (x,y) coordinates in the picture. Similarly, a "portion" of a picture may be, for example, a pixel, a macroblock, a slice, a frame, a field, a region bounding an object in the picture, the foreground of the picture, the background of the picture, or a particular set of (x,y) coordinates in the picture. As another example, a depth picture (depth image) may be, for example, a complete depth map or a partial depth map that only includes depth information for, for example, a single macroblock of a corresponding video frame.

Additionally, this application or its claims may refer to "determining" various pieces of information. Determining the information may include one or more of, for example, estimating the information, calculating the information, predicting the information, or retrieving the information from memory.

Similarly, "accessing" is intended to be a broad term. Accessing a piece of information may include any operation that, for example, uses, stores, sends, transmits, receives, retrieves, modifies, or provides the information.

Reference in the specification to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the following claims.

What is claimed is:

1. A method comprising:
   accessing a depth image corresponding to an intensity image;
   determining a segmentation based on the intensity image, wherein the intensity image is associated with the corresponding depth image that includes depth values for corresponding locations in the intensity image;
   applying the segmentation to the depth image to segment the depth image into multiple regions;
   enhancing said segmentation using said depth image to generate an enhanced segmentation; and
   modifying a depth value in the depth image based on the segmentation, wherein said modifying a depth value in the depth image based on the segmentation comprises filling one or more holes in said depth image using the enhanced segmentation to generate an improved depth image.

2. The method of claim 1 wherein the depth value is modified based on other depth values in the same region as the depth value, to produce a modified depth value.

3. The method of claim 1 wherein the depth value is in a first region, and depth values outside of the first region are not used in modifying the depth value.

4. The method of claim 1 wherein determining the segmentation is further based on the depth image.

5. The method of claim 4 wherein determining the segmentation comprises:

producing an initial segmentation based on the intensity image; and combining a first region from the initial segmentation and a second region from the initial segmentation into a combined region based on depth values in the depth image.

6. The method of claim 5 wherein combining comprises combining the first region and the second region if an average depth value for locations corresponding to the first region is within a threshold of an average depth value for locations corresponding to the second region.

7. The method of claim 5 wherein the depth value that is modified has a location corresponding to the combined region, and modifying the depth value comprises:

modifying the depth value based on a first depth value having a location corresponding to the first region in the initial segmentation and on a second depth value having a location corresponding to the second region in the initial segmentation.

8. The method of claim 7 wherein modifying the depth value comprises setting the depth value to a modified depth value that is based on an average of depth values for locations corresponding to the combined region.

9. The method of claim 1 wherein the depth value represents a depth value having noise, and the modified depth value reduces the noise.

10. The method of claim 1 wherein the depth value represents a hole, and the modified depth value fills the hole.

11. The method of claim 1 further comprising estimating the depth image.

12. The method of claim 1 wherein the intensity image comprises a video image that is associated with the corresponding depth image.

13. An apparatus comprising:

means for accessing a depth image corresponding to an intensity image; means for determining a segmentation based on the intensity image, wherein the intensity image is associated with the corresponding depth image that includes depth values for corresponding locations in the intensity image;

means for applying the segmentation to the depth image to segment the depth image into multiple regions;

means for enhancing said segmentation using said depth image to generate an enhanced segmentation; and means for modifying a depth value in the depth image based on the segmentation, wherein said modifying a depth value in the depth image based on the segmentation comprises filling one or more holes in said depth image using the enhanced segmentation to generate an improved depth image.

14. A non-transitory processor readable medium having stored thereon instructions for causing a processor to perform at least the following: accessing a depth image corresponding to an intensity image; determining a segmentation based on the intensity image, wherein the intensity image is associated with the corresponding depth image that includes depth values for corresponding locations in the intensity image;

applying the segmentation to the depth image to segment the depth image into multiple regions;

enhancing said segmentation using said depth image to generate an enhanced segmentation; and modifying a depth value in the depth image based on the segmentation, wherein said modifying a depth value in the depth image based on the segmentation comprises filling one or more holes in said depth image using the enhanced segmentation to generate an improved depth image.

15. An apparatus comprising a processor configured to perform at least the following:

accessing a depth image corresponding to an intensity image; determining a segmentation based on the intensity image, wherein the intensity image is associated with the corresponding depth image that includes depth values for corresponding locations in the intensity image;

applying the segmentation to the depth image to segment the depth image into multiple regions;

enhancing said segmentation using said depth image to generate an enhanced segmentation; and modifying a depth value in the depth image based on the segmentation, wherein said modifying a depth value in the depth image based on the segmentation comprises filling one or more holes in said depth image using the enhanced segmentation to generate an improved depth image.

16. An apparatus comprising a depth generation and hole filling module configured to perform at least the following:

accessing a depth image corresponding to an intensity image; determining a segmentation based on the intensity image, wherein the intensity image is associated with the corresponding depth image that includes depth values for corresponding locations in the intensity image;

applying the segmentation to the depth image to segment the depth image into multiple regions;

enhancing said segmentation using said depth image to generate an enhanced segmentation; and modifying a depth value in the depth image based on the segmentation, wherein said modifying a depth value in the depth image based on the segmentation comprises filling one or more holes in said depth image using the enhanced segmentation to generate an improved depth image.

17. The apparatus of claim 16 further comprising an encoder coupled to the depth generation and hole filling module to receive, from the depth generation and hole filling module, the depth image that includes the modified depth value and to encode the depth image that includes the modified depth value.

18. An apparatus comprising:

a depth generation and hole filling module configured to perform at least the following:

accessing a depth image corresponding to an intensity image;

determining a segmentation based on the intensity image, wherein the intensity image is associated with the corresponding depth image that includes depth values for corresponding locations in the intensity image, applying the segmentation to the depth image to segment the depth image into multiple regions, enhancing said segmentation using said depth image to generate an enhanced segmentation, and modifying a depth value in the depth image based on the segmentation, wherein said modifying a depth value in the depth image based on the segmentation comprises filling one or more holes in said depth image using the enhanced segmentation to generate an improved depth image;

an encoder coupled to the depth generation and hole filling module to receive, from the depth generation and hole filling module, the depth image that includes the modified depth value and to encode the depth image and provide an encoded depth image; and a modulator for modulating a signal that includes the encoded depth image.

19. An apparatus comprising:

a demodulator for demodulating a signal that includes an encoded video image;

a decoder for decoding the encoded video image to produce a decoded video image; and a depth generation and hole filling module configured to perform at least the following:

accessing a depth image corresponding to the decoded video image;

determining a segmentation based on the decoded video image, wherein the decoded video image is associated with the corresponding depth image that includes depth values for corresponding locations in the decoded video image, applying the segmentation to the depth image to segment the depth image into multiple regions, enhancing said segmentation using said depth image to generate an enhanced segmentation, and modifying a depth value in the depth image based on the segmentation, wherein said modifying a depth value in the depth image based on the segmentation comprises filling one or more holes in said depth image using the enhanced segmentation to generate an improved depth image.

20. The method as defined in claim 1, further comprising:

enhancing said enhanced segmentation using said improved depth image to produce a further enhanced segmentation; and modifying one or more depth values in said improved depth image using the further enhanced segmentation to generate a further improved depth image.

* * * * *